US009023938B2

(12) United States Patent
Loubaresse et al.

(10) Patent No.: US 9,023,938 B2
(45) Date of Patent: May 5, 2015

(54) METHOD FOR THE PRODUCTION OF A RUBBER COMPOSITION AT HIGH TEMPERATURE (75) Inventors: Jean-Marc Loubaresse, Clermont-Ferrand-Cedex (FR); Marie Eloy, Clermont-Ferrand-Cedex (FR); Floriandre Voisin, Clermont-Ferrand-Cedex (FR); Gérald Huguenot, Clermont-Ferrand-Cedex (FR); Julien Loyau, Clermont-Ferrand-Cedex (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 0 days.

(21) Appl. No.: 14/236,048
(22) PCT Filed: Jul. 25, 2012
(86) PCT No.: PCT/EP2012/064593
§ 371 (c)(1), (2), (4) Date: Mar. 10, 2014
(87) PCT Pub. No.: WO2013/017505
PCT Pub. Date: Feb. 7, 2013

(65) Prior Publication Data
US 2014/0200307 A1  Jul. 17, 2014

(30) Foreign Application Priority Data
Jul. 29, 2011  (FR) ...................................... 11 56943

(51) Int. Cl.
| B60C 1/00 | (2006.01) |
| C08K 3/00 | (2006.01) |
| C08L 7/00 | (2006.01) |
| B29B 7/00 | (2006.01) |
| B29B 7/10 | (2006.01) |
| B29B 7/18 | (2006.01) |
| B29B 7/74 | (2006.01) |
| B29B 7/82 | (2006.01) |
| B29B 7/90 | (2006.01) |

(52) U.S. Cl.
CPC . *C08L 7/00* (2013.01); *B29B 7/005* (2013.01); *B29B 7/103* (2013.01); *B29B 7/183* (2013.01); CPC ..... *B29B 7/7461* (2013.01); *B29B 7/7495* (2013.01); *B29B 7/823* (2013.01); *B29B 7/90* (2013.01)

(58) Field of Classification Search
CPC ........ B29B 7/005; B29B 7/103; B29B 7/183; B29B 7/7461; B29B 7/823; B29B 7/7495; B29B 7/90; C08L 7/00
USPC ................................................ 524/575.5, 492
See application file for complete search history.

(56) References Cited

U.S. PATENT DOCUMENTS

| 2002/0068774 | A1 | 6/2002 | Hotellier et al. | |
| 2002/0123555 | A1 | 9/2002 | Peter et al. | |
| 2006/0079627 | A1 | 4/2006 | Noguchi et al. | |
| 2007/0249775 | A1* | 10/2007 | Hogan et al. | 524/495 |
| 2010/0292386 | A1* | 11/2010 | Okel | 524/492 |

FOREIGN PATENT DOCUMENTS

| EP | 1213110 A1 | 6/2002 |
| EP | 1598394 A1 | 11/2005 |

OTHER PUBLICATIONS

PCT/EP2012/064593—Form PCT/ISA/210—International Search Report (English translation included), dated Oct. 17, 2012, 4 pages.

* cited by examiner

Primary Examiner — William Cheung
(74) Attorney, Agent, or Firm — Dickinson Wright PLLC (57) ABSTRACT Method for the production of an initial rubber composition, in the course of which the following steps are carried out in succession:
A—a rubber matrix, reinforcing fillers, and other components if required, with the exception of the cross-linking system, are introduced into a mixing means of the internal mixer type, comprising a mixing chamber in which there are mounted rotors which are driven in rotation and have radial projections forming a gap (e) between themselves and the vessel,
B—said components are mixed in the chamber until a uniform mixture is obtained, care being taken to ensure that the temperature of the mixture remains at or below 170° C., after which
C—the rotation speed of the rotors is adjusted so as to bring the rubber composition to a dropping temperature in the range from 180° C. to 240° C., in a time of less than 600 seconds, and preferably less than 400 seconds, and
D—when the dropping temperature has been reached, the initial rubber composition is removed from the internal mixer and the temperature of said composition is brought below 140° C. in less than 5 minutes.

9 Claims, 2 Drawing Sheets

METHOD FOR THE PRODUCTION OF A RUBBER COMPOSITION AT HIGH TEMPERATURE

This application claims benefit of the filing date of PCT/EP2012/064593, filed Jul. 25, 2012, which claims the benefit of FR1156943, filed Jul. 29, 2011, the entire contents of each of which are incorporated herein by reference for all purposes.

FIELD

The present disclosure relates to the field of the mixing of elastomers and more specifically to the production of rubber compositions intended for the manufacture of tires to be fitted to vehicles.

DESCRIPTION OF RELATED ART

Because of the performance requirements for modern tires, and the qualities required by road conditions which may be extreme, there is an increasing emphasis on the durability of tires and the reduction of their rolling resistance.

Persons skilled in the art are aware that the improvement of wear resistance may give rise to increased energy dissipation, and that the progress of recent years is the result of a compromise between these two factors, which impose certain limitations that are being overcome by modifying rubber compositions and exploring new manufacturing methods.

SUMMARY

The object of embodiments of the invention is to propose a method enabling the energy dissipation phenomena within the material to be greatly reduced when the material is subjected to cyclic stresses, without affecting the performance in terms of wear.

The viscoelastic properties of a material are described by physical quantities such as the viscous modulus (G''), the elastic modulus (G'), or the ratio $G''/G'=Tg\delta$, which is the tangent of the phase angle between stress and deformation when the material is subjected to a sinusoidal stress, and which can be used to characterize dissipation phenomena within the material, as well as for other purposes.

$$\frac{G''}{G'} = Tg\delta,$$

It is therefore particularly desirable to reduce the value of $Tg\delta$ in elastomer-based materials used for tire building in order to attenuate the phenomena associated with the heating of the tires and reduce the rolling resistance of vehicles.

In the method described in an unpublished patent application, FR 10/52949, a known type of continuous mixing device is used in a particular and original manner, providing operating ranges of said device which enable high shear levels to be achieved, in order to obtain rubber compositions which, unexpectedly, have highly unusual properties compared with those resulting from the usual production processes.

The method according to embodiments of the invention has the same objectives, and is based on the use of a more conventional mixing means of the internal mixer type, comprising a mixing chamber in which there are mounted rotors which are driven in rotation and have radial projections forming a gap between themselves and the vessel, in which gap the various components added previously to the chamber in specified proportions are to be mixed closely together.

The method includes steps in which:

A—a rubber matrix, reinforcing fillers, and other components if required, with the exception of the cross-linking system, are introduced into a mixing means of the internal mixer type, comprising a mixing chamber in which there are mounted rotors which are driven in rotation and have radial projections forming a gap between themselves and the vessel, B—said components are mixed in the chamber until a uniform mixture is obtained, care being taken to ensure that the temperature of the mixture remains at or below 170° C., after which C—the rotation speed of the rotors is adjusted so as to bring the rubber composition to a dropping temperature in the range from 180° C. to 240° C., in a time of less than 600 seconds, and preferably less than 400 seconds, and D—when the dropping temperature has been reached, the initial rubber composition is removed from the internal mixer and the temperature of said composition is brought below 140° C. in less than 5 minutes.

The final temperature rise, taking place in a very brief time and to a very high level compared with the temperature levels normally used in the rubber industry, enables a final composition to be produced from said initial composition which has unusual properties.

When the reinforcing fillers consist mainly of silica, the dropping temperature is preferably in the range from 180° C. to 200° C.

When the reinforcing fillers consist mainly of carbon black, the dropping temperature is preferably in the range from 200° C. to 240° C.

It is also possible to incorporate additives in step A.

Although this value is not limiting, a filling ratio of 70% or more is preferably chosen for the internal mixer.

The filling ratio is the portion of the volume occupied by the rubber composition in the mixing chamber, the volume of this portion being equal to the free volume available between the blades of the internal mixer and the inner wall of the chamber.

During step C, and before the initial rubber composition is removed from the mixer, it is helpful to maintain said composition at the dropping temperature for a given time, while ensuring that the total duration of said step C does not exceed 600 seconds.

Advantageously, in order to reach the desired temperature in the allotted time, provision is made to ensure that the total specific energy imparted to the mixture during all the mixing operations is in the range from 1000 to 7500 joules per gram.

In a conventional manner, at the end of step D, a final rubber composition is formed using one or more continuous or batch mixing means of the internal mixer and/or external mixer type, incorporating a specified volume of the initial rubber composition, the cross-linking system, and any necessary supplementary elastomer, fillers and additives, the operating parameters of the continuous or batch mixing means being chosen in such a way that the supplementary specific energy imparted to the rubber composition during this step is in the range from 500 to 2000 joules per gram.

The specific energy imparted to the rubber composition during a step of the manufacturing process in a mixing means is equal to the energy (in joules) provided to the mixture by the motor (or motors) responsible for rotating the mixer rotors, divided by the mass of the resulting rubber composition. This energy can be calculated by the following formula:

$$\left(\int_0^T P(t)dt\right) \div M.$$

in which
P(t) is the instantaneous power (in watts) provided by the motor (or motors), after the subtraction of the power consumed by the transmission means between the motor shaft and the blades,
M is the total mass (in grams) of mixture introduced into the internal mixer, and
T is the duration of the mixing step.

In a first approach, the power consumed by the transmission means can be calculated easily by measuring the electrical power consumed by the motor (or motors) when the installation is running with no load.

The properties of the composition will obviously be appreciated when the final mixture has been produced, in other words when all the components have been introduced, these components including, in particular, the cross-linking agents.

As will be shown subsequently on the basis of experimental results, the value of the tangent δ, □□ decreases over a wide range of rubber compositions produced by said method, as compared with the production of the same mixture using a conventional manufacturing method with exactly the same means.

In the context of the present description, the term "rubber composition" denotes a composition based on at least one elastomer, preferably of the diene type, such as a natural or synthetic rubber, comprising reinforcing fillers, additives, and a vulcanization system.

The elastomer (or "rubber" as it may equally well be called) is preferably of the diene type, but other elastomers may be used. The term "diene" elastomer denotes, as is known, an elastomer which is based, partially at least (that is to say, it is a homopolymer or a copolymer), on diene monomers (monomers with two carbon-carbon double bonds, which may or may not be conjugated).

The chosen diene elastomer preferably belongs to the group composed of the polybutadienes (BR) (notably those with a content of cis-1,4 bonds greater than 90%), synthetic polyisoprenes (IR), preferably of the cis-1,4 type, natural rubber (NR), butadiene copolymers, isoprene copolymers and mixtures of these elastomers; more preferably, these copolymers are chosen from the group composed of butadiene-styrene copolymers (SBR), isoprene-butadiene copolymers (BIR), isoprene-styrene copolymers (SIR), isoprene-butadiene-styrene copolymers (SBIR), isobutene and isoprene copolymers (IIR) and mixtures of these copolymers.

In other embodiments, the diene elastomer may also consist, wholly or partially, of another diene elastomer such as an SBR elastomer used, by blending or otherwise, with another elastomer, of the BR type for example.

The rubber composition may contain only one or a plurality of diene elastomers, the latter being usable in association with any type of synthetic elastomer other than a diene elastomer, or even with polymers other than elastomers.

Any filler known for its capacity to reinforce a rubber composition can be used as a reinforcing filler; for example, it may be an organic filler such as carbon black, or an inorganic filler such as silica, with which a coupling agent is associated in a known way.

Suitable carbon blacks include, notably, any of the carbon blacks which are conventionally used in tires (known as tire-grade blacks). Specific examples of the latter are carbon blacks of the (ASTM) 100, 200, 300, 600 or 700 grade (for example N134, N234, N326, N330, N347, N375, N683, and N772), and, more generally, blacks having specific surface areas which are preferably lower than 200 m$^2$ per gram (CTAB value).

Suitable reinforcing inorganic fillers include, notably, mineral fillers of the silica (SiO$_2$) type, notably precipitated or pyrogenic silica having a BET surface area of less than 450 m$^2$/g, or preferably less than 200 m$^2$/g. The proportion of reinforcing filler is preferably greater than 30 phr, for example between 40 and 140 phr (where phr signifies parts by weight per hundred parts of total elastomer).

The rubber composition is of the cross-linkable or cross-linked type; in other words, it comprises, by definition, a cross-linking system adapted to allow the composition to be cross-linked in the course of its curing (i.e. during its hardening). Preferably, the cross-linking system of the rubber matrix is what is known as a vulcanization system, in other words one which is based on sulphur (or a sulphur-donating agent) and a primary vulcanization accelerator. This basic vulcanization system may be supplemented with various known secondary accelerators or vulcanization accelerators. The sulphur is used at a preferred ratio of 0.5 to 10 phr; the primary vulcanization accelerator, a sulphenamide for example, is used at a preferred ratio of 0.5 to 10 phr.

The rubber composition may also include all or some of the additives customarily used in rubber matrices intended for tire manufacture, for example coupling agents, protective agents such as anti-ageing agents, antioxidants, antiozonants, plasticizers or extension oils, the latter being either aromatic or non-aromatic, notably very weakly aromatic or non-aromatic oils, such as those of the naphthenic or paraffinic types, having a high or, preferably, low viscosity, MES or TDAE oils, plasticizing resins with a high Tg of more than 30° C., agents facilitating the use (processability) of compositions in the raw state, tackifying resins, anti-reversion agents, and reinforcing resins.

The final composition produced in this way may then be calendered, for example into the form of a sheet or a plate, notably for characterization in the laboratory, or extruded, for example in order to form a rubber extrusion for tire manufacture.

BRIEF DESCRIPTION OF THE FIGURES

The following description is based on an exemplary embodiment of the method using the known devices, the operation of which will be summarized with reference to FIGS. 1 to 3, in which.

DETAILED DESCRIPTION OF SPECIFIC EMBODIMENTS

The means used to apply the method according to embodiments of the invention are known in themselves to those skilled in the art, and are described here solely as an example. The installation comprises an internal mixer 100, cooling means 200, in this case a roller tool, and mixing means intended to produce the final composition, wherein these mixing means may equally well be either an internal mixer similar to the mixer 100 or an external mixer of the roller tool type, identical to the cooling means 200.

Figure 1:
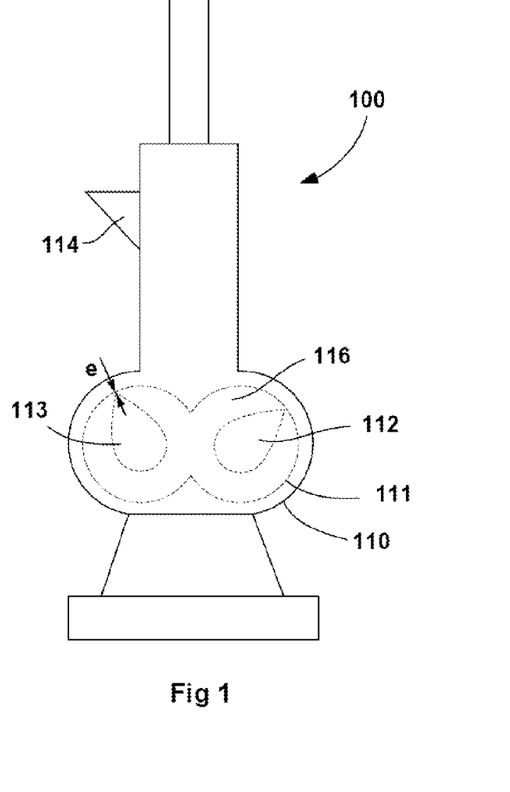
FIG. 1 is a schematic view of an internal mixer.

The internal mixer shown in FIG. 1 includes a chamber 110 whose internal surface 111 delimits the internal volume 116. The mixer may be, but is not limited to, an interpenetrating or tangential type of mixer.

A motor (not shown) causes the mixing blades 112 and 113 to rotate, using a transmission means of the gearbox type (not shown). The power consumption of said transmission means is substantially constant, and can be evaluated, as mentioned above, by running the installation with no load.

Introduction means 114 are provided at the head of the mixer 100 for the introduction of the components.

The gap e is the smallest distance between the blades and the internal surface 211 of the chamber 210.

In a known way, this internal mixer may also include heat regulating means for adjusting the temperature of the rubber composition inside the chamber.

Figure 2:
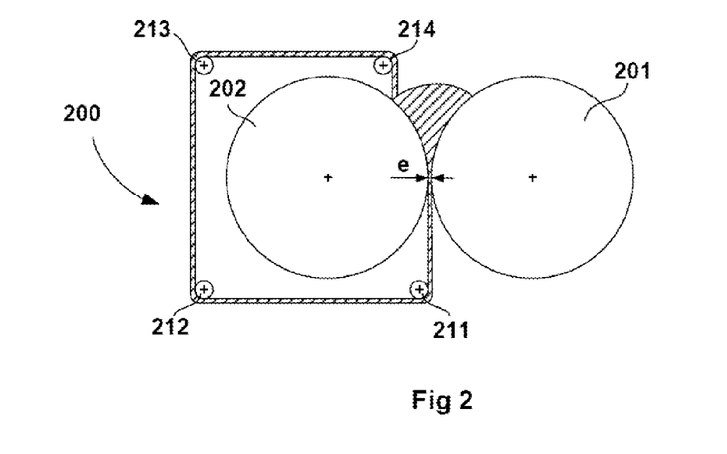
FIG. 2 is a schematic view of a roller tool.

The initial rubber composition leaving the continuous mixing apparatus can be cooled by a number of means known to those skilled in the art, used alone or in combination, such as:
- a tool such as that shown in FIG. 2, comprising two rollers 201 and 202, having channels in which a coolant fluid flows, located under the surfaces of the cylinders, the smaller gap e of this tool enabling the rubber to be calendered to create a thin sheet,
- a bath of refrigerated water through which the band of rubber to be cooled is passed, or
- a cold air blower.

This means must enable the initial rubber composition to be cooled from a dropping temperature in the range from 180° C. to 240° C. to a temperature of less than 140° C., in a time of less than 5 minutes, in order to prevent the degradation of the elastomer matrix which would occur if it were kept for too long at a high temperature. The sheet of rubber produced in the gap of the rollers 201 and 202 can usefully be recirculated around the rollers 211, 212, 213 and 214 in order to reduce the temperature more rapidly.

The final rubber composition is produced in a more conventional way which is known to those skilled in the art. In the present case, the use of a roller tool of the external mixer type has been preferred for the production of this final composition, during which the vulcanization system is introduced.

Although this type of mixer requires a long cycle time, it is particularly suitable when low-temperature mixing is desired.

Figure 3:
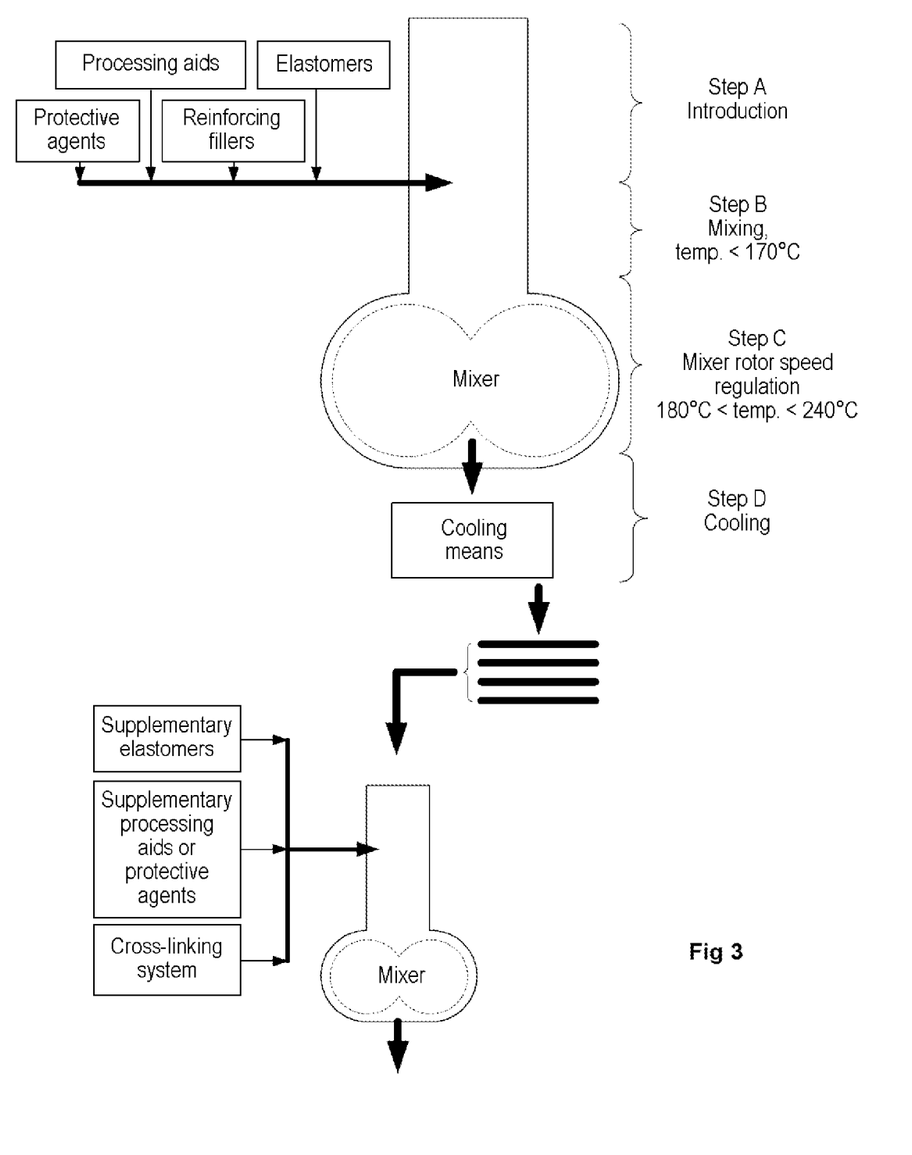
FIG. 3 is a schematic view of the various steps of the method.

FIG. 3 shows the steps of the method according to the invention.

In the first step A, the elastomers and the reinforcing fillers are added, and finally the supplementary components of the formula, such as the additives, are introduced.

Because of the large amount of energy imparted to the initial rubber composition in steps B and C, none of the principal components forming the cross-linking system is introduced during this first step A.

The mixing of the components continues, in step B, in a manner which is entirely conventional and known, using general mixing techniques. This transformation stage, the purpose of which is to ensure the intimate penetration of the reinforcing fillers into the elastomer matrix, takes place at a temperature of not more than 170° C.

When the expected mixing state has been attained, step C can begin, in which the rotation speed of the blades 112 and 113 is regulated so as to cause the temperature of the mixture in the chamber to rise until the dropping temperature, in the range between 180° C. and 240° C., is reached.

At this point in the description it should be noted that one of the known methods for rapidly heating the initial rubber composition contained in the chamber is that of increasing the proportion of reinforcing fillers relative to the quantity of elastomers, resulting in an increase in the viscosity of the mixture and in the amount of energy supplied by the shearing of the mixture in its passage through the gap e between the chamber and the blades. If this method is used, it will be necessary to add supplementary elastomers during the production of the final rubber composition, so as to restore the proportions required by the formulation of the final rubber composition.

The temperature rise of the mixture in the chamber must be as rapid as possible, and must take place within an interval of not more than 600 seconds, and preferably within an interval of not more than 400 seconds.

It is during this step C that the properties of the initial rubber composition are modified as compared with those obtained with a rubber composition which is not subjected to this large temperature increase.

Although not all the physical phenomena occurring in this process are fully explained, there is an observable redistribution of the reinforcing fillers in the elastomer matrix, which appears to be the cause of these changes in properties. By limiting the time during which the composition is brought to a very high temperature, any effects which might degrade the elastomer matrix itself are limited.

If the rubber composition contains a reinforcing filler composed mainly of silica, this change is mainly brought about by raising the initial composition to a temperature in the range from 180° C. to 200° C.

On the other hand, if the final rubber composition contains a reinforcing filler having a majority content of carbon black, the most notable effects are brought about by raising said composition to a temperature in the range from 200° C. to 240° C.

When this temperature is reached, step C can be prolonged by keeping the mixture at the final high temperature, considered to be the dropping temperature, for several tens of seconds. However, care should be taken to ensure that the total duration of step C, measured from the start of the temperature rise stage, corresponding to the set point for the change of the blade speed, to the set point for removal of the composition, corresponding to the opening of the chamber, does not exceed 600 seconds.

When the chamber is opened, in step D, the initial composition is collected on a cooling means so as to reduce the temperature from the dropping temperature to a temperature of less than 140° C., in a relatively short time, so as to limit the effects of temperature on the elastomer matrix. This time must not exceed five minutes.

At the end of step D, the initial rubber composition can be temporarily stored, or can be used directly for the manufacture of the final rubber composition.

The finishing of the final rubber composition is carried out with the aid of conventional mixing means into which a predetermined volume of the initial rubber composition is introduced, together with the set of components forming the cross-linking system and any necessary supplementary elastomers and additives.

This last stage can usefully be carried out in the cylinder tool depicted in FIG. 2, or in an internal mixer of the type described previously.

Alternatively, if the final composition is produced with the aid of an internal mixer of the type depicted in FIG. 1, and if the volume of elastomer introduced as a supplement is large, the method becomes similar to the known technique called the staggered rubber introduction technique, and a large temperature rise may occur, requiring a supplementary step for the introduction of the cross-linking system. This introduction can then take place in an external or internal mixer whose operating conditions have been adapted.

By way of example, the following comparative results were obtained for a rubber composition A based on natural rubber (NR) and carbon black, of the following type:

| Composition A | in phr |
|---|---|
| NR | 100 |
| N234 | 54 |
| 6PPD[(1)] | 3 |
| Paraffin 6266 | 1 |
| Stearic acid | 1.5 |
| ZnO | 3 |
| CBS[(2)] | 1.2 |
| Sulphur | 1.2 |

[(1)]Santoflex 6PPD supplied by the Flexsys company
[(2)]Santocure CBS supplied by the Flexsys company The improved final rubber composition A was obtained by the method according to the invention, the main operating parameters of which are summarized below:

| Method according to the invention, | |
|---|---|
| Initial composition A | Internal mixer Steps A, B, C |
| Volume of chamber | 422 cm$^3$ |
| Dropping temperature | 200° C. |
| Filling factor | 70% |
| Specific energy supplied | 7600 J/g |
| Residence time between 180° C. and 200° C. | 500 s |

| Method according to the invention, | |
|---|---|
| Initial composition A | Cylinder tool Step D |
| Cooling time | 4 mins |
| Cylinder temperature | 30° C. |
| Gap | 3 mm |
| Cylinder diameter | 150 mm |
| Speed of cylinder 1 | 15 rpm |
| Speed of cylinder 2 | 20 rpm |

| Method according to the invention | |
|---|---|
| Final composition A | Finishing with cylinder tool |
| Mixing time | 10 mins |
| Gap | 2.5 mm |
| Cylinder diameter | 150 mm |
| Speed of cylinder 1 | 15 rpm |
| Speed of cylinder 2 | 20 rpm |

The control results were obtained using a conventional control operating method with an internal and an external mixer in two stages (the cross-linking system being introduced in a cylinder tool of the external mixer type) for a rubber composition A' identical to A, the main operating parameters of which are summarized below:

| Conventional method | |
|---|---|
| Initial composition A' | Internal mixer |
| Volume of chamber | 422 cm$^3$ |
| Mixing time | 150 s |
| Dropping temperature | 165° C. |
| Filling factor | 70% |
| Blade speed | 80 & 100 rpm |
| Specific energy supplied | 1250 J/g |

| Conventional method | |
|---|---|
| Final composition A' | Finishing with cylinder tool |
| Mixing time | 10 mins |
| Gap | 2.5 mm |
| Cylinder diameter | 150 mm |
| Speed of cylinder 1 | 15 rpm |
| Speed of cylinder 2 | 20 rpm |

The following comparative values (to base 100) were obtained:

| | Control method Composition A' | Method according to the the invention Composition A |
|---|---|---|
| Modulus at 100 | 100 | 86 |
| Modulus at 300 | 100 | 112 |
| Modulus at 300/Modulus at 100 | 100 | 130 |
| Tangent δ$_{max}$ | 100 | 70 |

"Modulus at 100" signifies the modulus of elongation of a test specimen made with the rubber composition, after vulcanization at 150° C.

These measurements were made according to French standard NFT 46-002 of September 1988, which specifies the measurement, in first elongation (i.e. without an accommodation cycle—the moduli are then denoted M), of the true secant moduli (i.e. those calculated on the basis of the real cross section of the test specimen), expressed in MPa, at 100% and 300% elongation. These tensile measurements were made in normal temperature and humidity conditions (23° C.+/−2° C., 50+/−5% relative humidity; French standard NF T 40-01, December 1979).

The dynamic properties (tangent δ) were measured with a viscosity analyser (Metravib VA4000), according to ASTM D5992-96. The response of a sample of the vulcanized rubber composition (cylindrical test specimen with a thickness of 2 mm and a cross section of 315 mm$^2$), subjected to alternating simple sinusoidal shear stress at a frequency of 10 Hz and a temperature of 23° C., was recorded. A peak-to-peak deformation amplitude scan is performed from 0.1% to 50% (outward cycle) and then from 50% to 0.1% (return cycle); for the return cycle, the maximum value of the loss factor, denoted tan δ$_{max}$, was recorded.

Other tests were conducted for a rubber composition B identical to A, with variations in the dropping temperature.

| Composition B | in phr |
|---|---|
| NR | 100 |
| N234 | 54 |
| 6PPD[(1)] | 3 |
| Paraffin 6266 | 1 |
| Stearic acid | 1.5 |
| ZnO | 3 |
| CBS[(2)] | 1.2 |
| Sulphur | 1.2 |

[(1)]Santoflex 6PPD supplied by the Flexsys company
[(2)]Santocure CBS supplied by the Flexsys company The improved final rubber composition B was obtained by the method according to the invention, the main operating parameters of which are summarized below:

| Method according to the invention, | |
|---|---|
| Initial composition B | Internal mixer Steps A, B, C |
| Volume of chamber | 422 cm³ |
| Dropping temperature | 240° C. |
| Filling factor | 70% |
| Specific energy supplied | 2490 J/g |
| Residence time between 180° C. and 200° C. | 200 s |

| Method according to the invention, | |
|---|---|
| Initial composition B | Cylinder tool Step D |
| Cooling time | 4 mins |
| Cylinder temperature | 30° C. |
| Gap | 3 mm |
| Cylinder diameter | 150 mm |
| Speed of cylinder 1 | 15 rpm |
| Speed of cylinder 2 | 20 rpm |

| Method according to the invention | |
|---|---|
| Final composition B | Finishing with cylinder tool |
| Mixing time | 10 mins |
| Gap | 2.5 mm |
| Cylinder diameter | 150 mm |
| Speed of cylinder 1 | 15 rpm |
| Speed of cylinder 2 | 20 rpm |

The control B' was produced by means of a conventional method identical to that of A'.

| Conventional method | |
|---|---|
| Initial composition B' | Internal mixer |
| Volume of chamber | 422 cm³ |
| Mixing time | 150 s |
| Dropping temperature | 165° C. |
| Filling factor | 70% |
| Blade speed | 80 & 120 rpm |
| Specific energy supplied | 1250 J/g |
| Final composition B' | Finishing with cylinder tool |
| Mixing time | 10 mins |
| Gap | 2.5 mm |
| Cylinder diameter | 150 mm |
| Speed of cylinder 1 | 15 rpm |
| Speed of cylinder 2 | 20 rpm |

The following comparative values (to base 100) were obtained:

| | Control method Composition B' | Method according to the invention Composition B |
|---|---|---|
| Modulus at 100 | 100 | 86 |
| Modulus at 300 | 100 | 107 |
| Modulus at 300/Modulus at 100 | 100 | 119 |
| Tangent $\delta_{max}$ | 100 | 82 |

A third test was conducted using a silica-based rubber composition C:

| Components | in phr |
|---|---|
| NR | 100 |
| Silica 160MP | 50 |
| N234 | 3 |
| Liquid silane | 5.5 |
| TMQ | 1 |
| 6PPD[(1)] | 1.5 |
| Paraffin 6266 | 1 |
| Stearic acid | 2.5 |
| ZnO | 3 |
| CBS[(2)] | 1.8 |
| Sulphur | 1.5 |

[(1)]Santoflex 6PPD supplied by the Flexsys company
[(2)]Santocure CBS supplied by the Flexsys company The improved final rubber composition C was obtained by the method according to the invention, the main operating parameters of which are summarized below:

| Method according to the invention, | |
|---|---|
| Initial composition C | Internal mixer Steps A, B, C |
| Volume of chamber | 7777 cm³ |
| Dropping temperature | 180° C. |
| Filling factor | 70% |
| Specific energy supplied | 1390 J/g |
| Residence time between 180° C. and 200° C. | 60 s |

| Method according to the invention, | |
|---|---|
| Initial composition C | Cylinder tool Step D |
| Cooling time | 4 mins |
| Cylinder temperature | 30° C. |
| Gap | 2 mm |
| Cylinder diameter | 300 mm |
| Speed of cylinder 1 | 12 rpm |
| Speed of cylinder 2 | 16.2 rpm |

| Method according to the invention | |
|---|---|
| Final composition C | Finishing with cylinder tool |
| Mixing time | 10 mins |
| Gap | 2 mm |
| Cylinder diameter | 300 mm |
| Speed of cylinder 1 | 12 rpm |
| Speed of cylinder 2 | 16.2 rpm |

The control C' was produced by a conventional method identical to the preceding ones.

| Conventional method | |
|---|---|
| Initial composition C' | Internal mixer |
| Volume of chamber | 7777 cm³ |
| Mixing time | 230 s |
| Dropping temperature | 165° C. |
| Filling factor | 70% |
| Blade speed | 50 rpm |
| Specific energy supplied | 850 J/g |
| Final composition C' | Finishing with cylinder tool |
| Mixing time | 10 mins |
| Gap | 3.5 mm |
| Cylinder diameter | 300 mm |

-continued

| Conventional method | |
|---|---|
| Speed of cylinder 1 | 12 rpm |
| Speed of cylinder 2 | 16.2 rpm |

The following comparative values (to base 100) were obtained:

| | Control method<br>Composition C' | Method according to the invention<br>Composition C |
|---|---|---|
| Modulus at 100 | 100 | 94 |
| Modulus at 300 | 100 | 114 |
| Modulus at 300/Modulus at 100 | 100 | 122 |
| Tangent $\delta_{max}$ | 100 | 81 |

By way of example, the following comparative results were obtained for a rubber composition D based on synthetic elastomers (SBR and BR) and silica, of the following type:

| Composition D | in phr |
|---|---|
| BR | 30 |
| Functional SBR D3* | 70 |
| Silica 165G | 70 |
| N234 | 3 |
| 6PPD[1] | 1.9 |
| Oil | 13 |
| Ozone wax | 1.5 |
| Resin | 5.5 |
| Liquid silane | 5.3 |
| Stearic acid | 2 |
| DPG | 1.4 |
| ZnO | 1.2 |
| CBS[2] | 1.6 |
| Sulphur | 1 |

[1] Santoflex 6PPD supplied by the Flexsys company
[2] Santocure CBS supplied by the Flexsys company The improved final rubber composition D was obtained by the method according to the invention, the main operating parameters of which are summarized below:

| Method according to the invention, | |
|---|---|
| Initial composition D | Internal mixer Steps A, B, C |
| Volume of chamber | 3332 cm³ |
| Dropping temperature | 185° C. |
| Filling factor | 70% |
| Specific energy supplied | 520 J/g |
| Residence time between 180° C. and 200° C. | 30 s |

| Method according to the invention, | |
|---|---|
| Initial composition D | Cylinder tool Step D |
| Cooling time | 4 mins |
| Cylinder temperature | 50° C. |
| Gap | 3 mm |
| Cylinder diameter | 200 mm |
| Speed of cylinder 1 | 17 rpm |
| Speed of cylinder 2 | 13 rpm |

| Method according to the invention | |
|---|---|
| Final composition D | Finishing with cylinder tool |
| Mixing time | 10 mins |
| Gap | 2.5 mm |
| Cylinder diameter | 200 mm |
| Speed of cylinder 1 | 17 rpm |
| Speed of cylinder 2 | 13 rpm |

The control results were obtained using a conventional control operating method with an internal and an external mixer in two stages (the cross-linking system being introduced in a cylinder tool of the external mixer type) for a rubber composition D' identical to D, the main operating parameters of which are summarized below:

| Conventional method | |
|---|---|
| Initial composition D' | Internal mixer |
| Volume of chamber | 3332 cm³ |
| Mixing time | 250 s |
| Dropping temperature | 160° C. |
| Filling factor | 70% |
| Blade speed | 40 and 50 rpm |
| Specific energy supplied | 430 J/g |

| Final composition D' | Finishing with cylinder tool |
|---|---|
| Mixing time | 10 mins |
| Gap | 2.5 mm |
| Cylinder diameter | 200 mm |
| Speed of cylinder 1 | 17 rpm |
| Speed of cylinder 2 | 13 rpm |

The following comparative values (to base 100) were obtained:

| | Control method<br>Composition D' | Method according to the invention<br>Composition D |
|---|---|---|
| Modulus at 100 | 100 | 91 |
| Modulus at 300 | 100 | 100 |
| Modulus at 300/Modulus at 100 | 100 | 111 |
| Tangent $\delta_{max}$ | 100 | 91 |

By way of example, the following comparative results were obtained for a rubber composition E based on a cut of natural elastomers (NR and SBR) and carbon black, of the following type:

| Composition E | in phr |
|---|---|
| NR | 50 |
| SBR | 50 |
| N234 | 54 |
| 6PPD[1] | 2 |
| Paraffin 6266 | 1 |
| Stearic acid | 2 |
| ZnO | 1.2 |

-continued

| Composition E | in phr |
|---|---|
| CBS[2] | 1.1 |
| Sulphur | 1.1 |

[1]Santoflex 6PPD supplied by the Flexsys company
[2]Santocure CBS supplied by the Flexsys company The improved final rubber composition E was obtained by the method according to the invention, the main operating parameters of which are summarized below:

| Method according to the invention, | |
|---|---|
| Initial composition E | Internal mixer Steps A, B, C |
| Volume of chamber | 3332 cm³ |
| Dropping temperature | 190° C. |
| Filling factor | 75% |
| Specific energy supplied | 1270 J/g |
| Residence time between 180° C. and 200° C. | 60 s |

| Method according to the invention, | |
|---|---|
| Initial composition E | Cylinder tool Step D |
| Cooling time | 4 mins |
| Cylinder temperature | 23° C. |
| Gap | 3 mm |
| Cylinder diameter | 200 mm |
| Speed of cylinder 1 | 17 rpm |
| Speed of cylinder 2 | 13 rpm |

| Method according to the invention | |
|---|---|
| Final composition E | Finishing with cylinder tool |
| Mixing time | 10 mins |
| Gap | 2.5 mm |
| Cylinder diameter | 200 mm |
| Speed of cylinder 1 | 17 rpm |
| Speed of cylinder 2 | 13 rpm |

The control results were obtained using a conventional control operating method with an internal and an external mixer in two stages (the cross-linking system being introduced in a cylinder tool of the external mixer type) for a rubber composition E' identical to E, the main operating parameters of which are summarized below:

| Conventional method | |
|---|---|
| Initial composition E' | Internal mixer |
| Volume of chamber | 3332 cm³ |
| Mixing time | 230 s |
| Dropping temperature | 170° C. |
| Filling factor | 72% |
| Blade speed | 55 rpm |
| Specific energy supplied | 970 J/g |
| Final composition E' | Finishing with cylinder tool |
| Mixing time | 10 mins |
| Gap | 2.5 mm |
| Cylinder diameter | 200 mm |
| Speed of cylinder 1 | 17 rpm |
| Speed of cylinder 2 | 13 rpm |

The following comparative values (to base 100) were obtained:

| | Control method Composition E' | Method according to the invention Composition E |
|---|---|---|
| Modulus at 100 | 100 | 98 |
| Modulus at 300 | 100 | 103 |
| Modulus at 300/Modulus at 100 | 100 | 104 |
| Tangent $\delta_{max}$ | 100 | 86 |

In all the cases described by way of example, there is a marked decrease of the value of tangent $\delta_{max}$, and an increase of the reinforcement index, defined as the ratio between the modulus at 300% and the modulus at 100%.

The invention claimed is:

1. A method for the production of an initial rubber composition, in the course of which the following steps are carried out in succession:
   A—introducing a rubber matrix, reinforcing fillers, and other components if required, with the exception of the cross-linking system, into a mixing means of the internal mixer type, comprising a mixing chamber in which there are mounted rotors which are driven in rotation and have radial projections forming a gap (e) between themselves and the vessel,
   B—mixing said components in the chamber until a uniform mixture is obtained, while ensuring that the temperature of the mixture remains at or below 170° C., after which
   C—adjusting a rotation speed of the mounted rotors so as to bring the mixture to a dropping temperature in the range from 180° C. to 240° C., in a time of less than 600 seconds, and
   D—when the dropping temperature has been reached, removing an initial rubber composition from the internal mixer and bringing the temperature of said initial rubber composition below 140° C. in less than 5 minutes.

2. The method according to claim 1, wherein the reinforcing fillers consist mainly of silica, and wherein the dropping temperature is in the range from 180° C. to 200° C.

3. The method according to claim 1, wherein the reinforcing fillers consist mainly of carbon black, and wherein the dropping temperature is in the range from 200° C. to 240° C.

4. The method according to claim 1, further comprising incorporating additives during step A.

5. The method according to claim 1, wherein the internal mixer has a filling ratio that is equal to or greater than 70%.

6. The method according to claim 1, wherein, during step C, and before removing the initial rubber composition from the mixer, said composition is kept at the dropping temperature for a given time, while ensuring that the total duration of said step C does not exceed 600 seconds.

7. The method according to claim 1, wherein the specific energy imparted to the mixture is in the range from 1000 joules/gram to 7500 joules/gram.

8. The method according to claim 1, further comprising at the end of step D, forming a final rubber composition using one or more continuous or batch mixing means of the internal mixer and/or external mixer type, by incorporating a specified volume of the initial rubber composition, the cross-linking system, and any necessary supplementary elastomer, fillers and additives, wherein operating parameters of the continuous or batch mixing means are chosen in such a way that the supplementary specific energy imparted to the rubber composition during this step is in the range from 500 to 2000 joules per gram.

9. The method according to claim 1, wherein in step C, the mixture is brought to a dropping temperature in a time of less than 400 seconds.

* * * * *